United States Patent
Zheng

(10) Patent No.: US 8,208,810 B2
(45) Date of Patent: Jun. 26, 2012

(54) METHOD, APPARATUS AND SYSTEM FOR BEARING IP PACKETS OVER PASSIVE OPTICAL NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 12/649,978

(22) Filed: Dec. 30, 2009

(65) Prior Publication Data

US 2010/0104288 A1    Apr. 29, 2010

Related U.S. Application Data

(63) Continuation of application No. PCT/CN2008/071832, filed on Jul. 31, 2008.

(30) Foreign Application Priority Data

Jul. 31, 2007    (CN) .......................... 2007 1 0137652

(51) Int. Cl.
*H04J 14/00* (2006.01)
(52) U.S. Cl. ................ 398/67; 398/70; 398/71
(58) Field of Classification Search ............ 398/58, 398/66–72
See application file for complete search history.

(56) References Cited

U.S. PATENT DOCUMENTS

| 6,870,836 | B1 | 3/2005 | Dyke et al. |
| 7,630,637 | B2 * | 12/2009 | Mizutani et al. ............ 398/67 |

FOREIGN PATENT DOCUMENTS

| CN | 1484898 A | 3/2004 |
| CN | 101005445 A | 7/2007 |
| WO | WO 02/45308 A1 | 6/2002 |

OTHER PUBLICATIONS

Cauvin et al., "Common Technical Specification of the G-PON System Among Major Worldwide Access Carrier", IEEE Communication Magazine, Oct. 2006, pp. 34-40.*
Office Action issued in corresponding Chinese Patent Application No. 200710137652X, mailed Dec. 14, 2010.
European Search Report issued in corresponding European Patent Application No. 08783825.6, mailed Nov. 19, 2010.
Written Opinion of the International Searching Authority issued in corresponding PCT Patent Application No. PCT/CN2008/071832, mailed Nov. 20, 2008.
Nakamura et al., "Proposal of Networking by PON Technologies for Full and Ethernet Services in FTTx", Journal of Lightwave Technology, vol. 22, No. 11, Nov. 2004.
Davey et al., "Designing Long Reach Optical Access Networks", BT Technology Journal, vol. 24 No. 2, Apr. 2006.
Cauvin et al., "Common Technical Specification of the G-PON System Among Major Worldwide Access Carriers", IEEE Communications Magazine, Oct. 2006.

(Continued)

*Primary Examiner* — Dzung Tran
(74) *Attorney, Agent, or Firm* — Brinks Hofer Gilson & Lione

(57) ABSTRACT

A method, apparatus and system for bearing Internet Protocol (IP) packets over a Passive Optical Network (PON) are disclosed. The method includes obtaining an IP packet, converting the IP packet into a Gigabit PON Encapsulation Method (GEM) frame. The method further includes performing a Gigabit PON Transmission Convergence (GTC) framing on the GEM frame to obtain a GTC frame and performing a PON physical layer processing on the GTC frame.

10 Claims, 13 Drawing Sheets

OTHER PUBLICATIONS

Lucent Technologies, Agere Systems and PMC Sierra, MCI, "Direct Mapping for IP/MPLS-Related Protocols over GFP", Study Group 15—Delayed Contribution 80, International Telecommunication Union, Nov. 29-Dec. 3, 2004.

China Telecom, "Requirements for Supporting the Direct Mapping of IP Package into GFP (G.7041)", Study Group 15—Delayed Contribution 1103, International Telecommunication Union, Apr. 19-30, 2004.

Information technology—Telecommunications and information Exchange Between Systems—Local and Metropolitan area networks—Specific Requirements, Part 11: Wireless LAN Medium Access Control (MAC) and Physical Layer (PHY) Specifications, ANSI/IEEE Std 802.11, 1999 Edition. (Reaffirmed 2003).

IEEE Standard for Local and Metropolitan Area Networks, Part 16: Air Interface for Fixed and Mobile Broadband Wireless Access Systems—Amendment 2: Physical and Medium Access Control Layers for Combined Fixed and Mobile Operation in Licensed Bands and Corrigendum 1, IEEE Std 802.16e™ 2005 and IEEE Std 802.16™-2004/Cor1-2005.

International Search Report issued in corresponding PCT Application No. PCT/2008/071832; issued Nov. 20, 2008.

* cited by examiner

METHOD, APPARATUS AND SYSTEM FOR BEARING IP PACKETS OVER PASSIVE OPTICAL NETWORK

CROSS-REFERENCE TO RELATED APPLICATIONS

This application is a continuation of International Application No. PCT/CN2008/071832, filed on Jul. 31, 2008, which claims priority to Chinese Patent Application No. 200710137652.X, filed on Jul. 31, 2007, both of which are hereby incorporated by reference in their entireties.

FIELD OF THE DISCLOSURE

The present disclosure relates to a Passive Optical Network (PON) technology, and in particular, to a technology for bearing Internet Protocol (IP) packets over a PON.

BACKGROUND

PON is an emerging last-mile optical broadband access technology, where no node device is needed at optical branching points while a simple optical branching device will serve the purpose. Therefore, PON saves fiber resources and equipment room investment, shares bandwidth resources, and has the features of high device security, fast construction, and low comprehensive construction cost.

The PON technology is applicable to an Optical Access Network (OAN). A reference architecture of the OAN is shown in FIG. 1. The OAN consists of a Customer Premises Network (CPN), an Access Network and a Service Node Function (SNF). The CPN has a User Network Interface (UNI) with the access network and T is a reference point of the UNI. The access network has a Service Node Interface (SNI) with the SNF and V is a reference point of the SNI. The CPN mainly includes a Customer Premises Equipment (CPE). The access network includes an Adaptation Function (AF), an Optical Network Unit (ONU)/Optical Network Terminal (ONT), an Optical Distribution Network (ODN), and an Optical Line Terminal (OLT). It should be noted that the PON includes the ONU/ONT and the OLT and the ONU/ONT is connected to the OLT via the ODN.

In the access network, the AF is optional, and provides conversion between the ONU/ONT interface and the UNI. The AF may be built in the ONU, in which case, reference point (a) is unnecessary. The AF may also be placed behind the OLT to provide conversion between the OLT interface and the SNI. The AF may be regarded as either a function of the CPN or a function of the access network. The ONT provides a network interface for the ODN and connects one or more ODNs. The ODN provides transport for the OLT and the ONU. The ONU provides a user side interface for the access network and is connected to the ODN.

For packets sent by the CPE, after the AF receives the packets, the AF may convert the packet format from the UNI format to the format of an interface, such as an Ethernet link, that can be connected to the ONU. Then the ONU converts the packets into a format that can support packet transfer over the ODN, such as the encapsulation format of an Ethernet Passive Optical Network (EPON) and the general frame encapsulation format of a Gigabit Passive Optical Network (GPON). Finally, the OLT converts the packets into a format of an SNI, such as an Ethernet link, and delivers the packets to the SNF. For packets sent by the SNF, a reverse process is followed.

At present, when PON provides backhaul transport for a Base Station (BS), a mobile terminal does not send Ethernet frames but IP packets to the BS and does not use a Media Access Control (MAC) address or a VLAN ID to carry user information. A PON chip in the prior art supports only Ethernet over GPON Encapsulation Method (ETH over GEM) or only Time Division Multiplexing (TDM) packets while bearing of IP packets is not supported.

SUMMARY

A method for bearing IP packets over a PON includes: obtaining an IP packet; converting the IP packet into a Gigabit PON Encapsulation Method (GEM) frame; performing Gigabit PON Transmission Convergence (GTC) framing on the GEM frame to obtain a GTC frame; and performing PON physical layer processing on the GTC frame.

An apparatus for bearing IP packets over a PON according to an embodiment of the present disclosure includes:
an IP packet obtaining unit, configured to obtain an IP packet;
a PON Transmission Convergence (TC) layer function unit, configured to convert the IP packet obtained by the IP packet obtaining unit into a Gigabit PON Encapsulation Method (GEM) frame, perform GTC framing on the GEM to obtain a GTC frame and perform PON physical layer processing on the GTC frame;
an Optical Distribution Network (ODN) interface function unit, configured to transfer the PON physical layer processed frame provided by the PON TC layer function unit to an ODN.

A PON system includes an Optical Line Termination (OLT), an Optical Distribution Network (ODN) and at least one Base Station (BS). The OLT is connected to the BS via the ODN. The OLT is the above apparatus for bearing IP packets over a PON. The BS is the above apparatus for bearing IP packets over a PON; the OLT cooperates with the BS via the ODN to realize bearing of IP packets over the PON.

In several embodiments of the present disclosure, after an IP packet is obtained, the IP packet may be converted into a GEM frame; then GTC framing is performed on the GEM frame to obtain a GTC frame; and then PON physical layer processing is performed on the GTC frame. After these steps, the IP packet is converted into a PON physical layer processed frame so that the IP packet can be transferred in the ODN and the purpose of bearing IP packets over a PON is realized.

In several other embodiments of the present disclosure, after a PON physical layer processed frame is obtained, the PON physical layer processed frame may be converted into a GTC frame; then GTC framing sub-layer processing is performed on the GTC frame to obtain a GEM frame; and then the GEM frame is converted into an IP packet. After these steps, a PON physical layer processed frame transferred in the ODN is converted into an IP packet so that the purpose of bearing IP packets over a PON is realized.

DETAILED DESCRIPTION OF THE DISCLOSURE

Because embodiments of the present disclosure relate to the GPON protocol stack, before the embodiments are described, the GPON protocol stack is explained with reference to FIG. 2.

Figure 1:
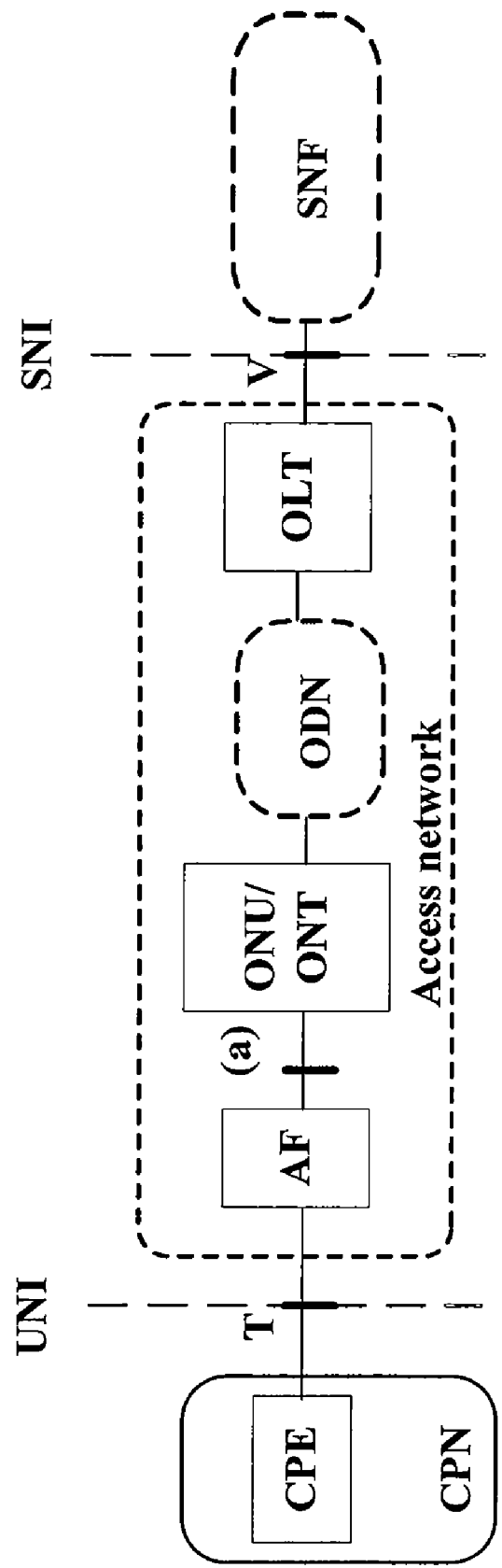
FIG. 1 shows a reference architecture of an optical access network in prior art.
Figure 2:
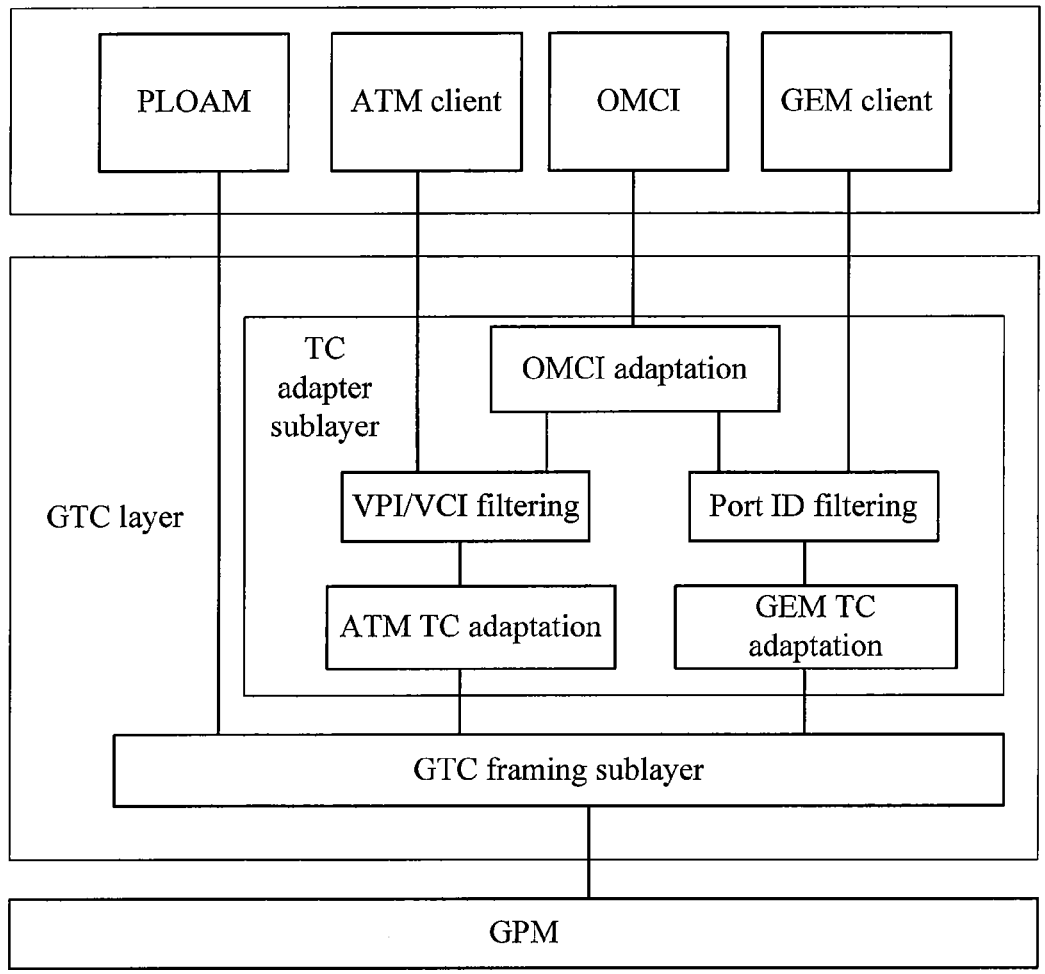
FIG. 2 is a schematic diagram of the GPON protocol stack.

As shown in FIG. 2, the GPON protocol stack consists of three layers. One of the layers is the GPON Transmission Convergence (GTC) layer, which includes two sub-layers:

1. TC Adapter Sub-layer

The TC adapter sub-layer is adapted to: slice service data received from an Asynchronous Transfer Mode (ATM) client into ATM cells and slice service data received from a GPON Encapsulation Method (GEM) client into GEM data blocks; the TC adapter sub-layer is also adapted to assemble ATM cells or GEM data blocks in a GTC frame into appropriate service data.

2. GTC Framing Sub-layer

The GTC framing sub-layer is adapted to assemble GTC TC frames. In particular, the GTC framing sub-layer adds a GTC TC frame header before an ATM cell or a GEM data block according to control information of Physical Layer Operation, Administration and Maintenance (PLOAM) to create a complete GTC TC frame and sends the frame to the GPON Physical Media Dependent Layer (GPM); the GTC framing sub-layer is also adapted to: remove frame header information from a GTC TC frame received from the GPM and send the frame to the TC adapter sub-layer for processing.

Another layer of the GPON protocol stack is GPM, which transports GTC frames in optical fibers.

A third layer of the GPON protocol stack includes an ATM client, an GEM client and:

PLOAM: configured to perform operation, administration and maintenance at the physical layer of the PON; and ONU Management and Control Interface (OMCI): the OLT controls the ONT via the OMCI; like common service data, OMCI data can be encapsulated into ATM cells or GEM data blocks for transfer.

The GTC layer of GPON provides two encapsulation methods for service data, ATM encapsulation and GEM encapsulation. The ATM encapsulation method encapsulates service data in 53-byte ATM cells for transfer, which means ATM encapsulation is fixed-length encapsulation. GEM encapsulation is a variable-length encapsulation method and allows variation of GEM frame lengths according to the length of service data. GEM encapsulation supports both TDM and Ethernet packets.

Figure 3:
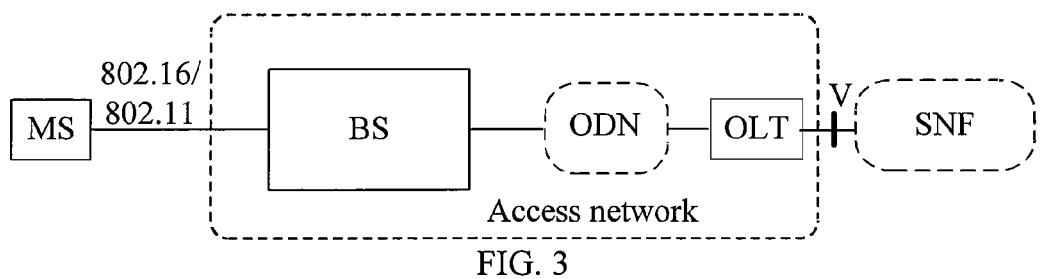
FIG. 3 is a schematic diagram of an optical access network according to an embodiment of the present disclosure.

A method for bearing IP packets over a PON according to an embodiment of the present disclosure is described with reference to FIG. 3. As shown in FIG. 3, in an OAN based on PON backhaul transport according to the present disclosure, the ONU is a Base Station (BS) and a Mobile Subscriber Station (MS) has an 802.16/802.11 compliant radio communication interface with the BS.

Figure 4:
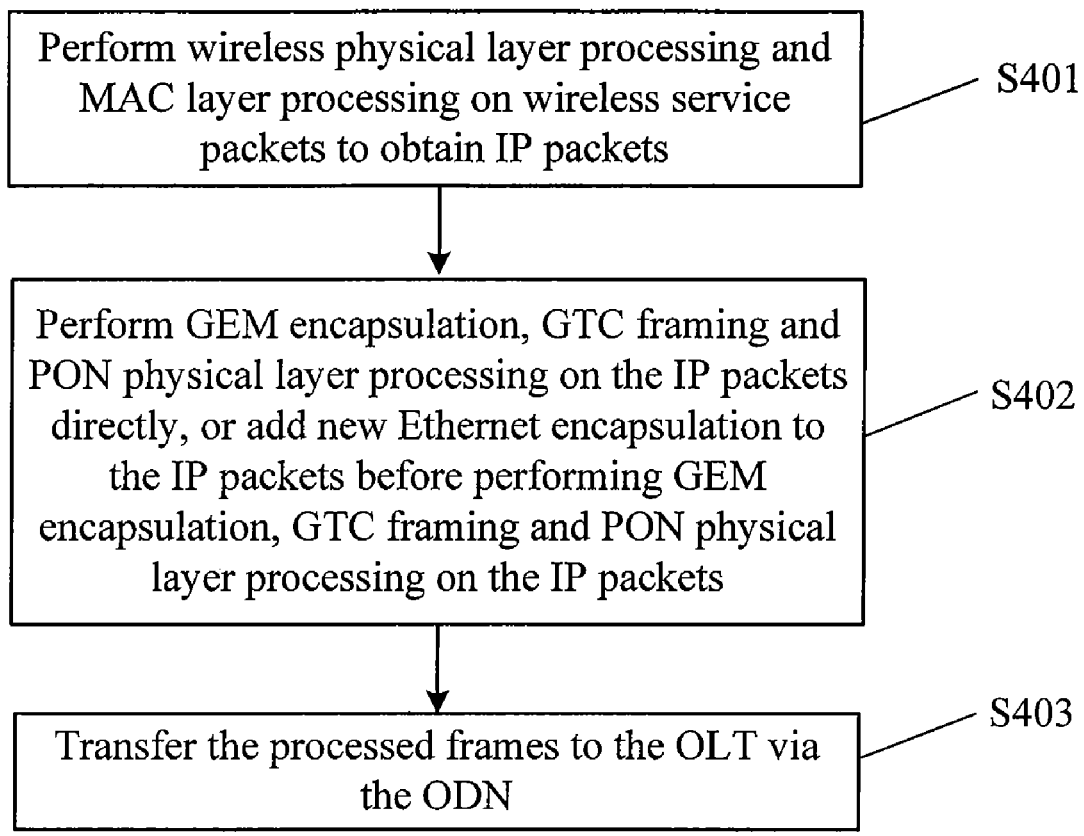
FIG. 4 is a flowchart where a BS processes a radio air interface packet according to an embodiment of the present disclosure.

In FIG. 3, the BS processes received packets as follows:

As shown in FIG. 4, packets from the radio air interface (802.16/802.11), or wireless service packets, are processed in the following steps:

S401. Wireless physical layer and Media Access Control (MAC) layer processing is performed on the wireless service packets to obtain IP packets.

S402. GEM encapsulation, GTC framing and PON physical layer processing are performed on the IP packets directly, or new Ethernet encapsulation is added to the IP packets before GEM encapsulation, GTC framing and PON physical layer processing are performed on the IP packets.

In particular, the IP packets are changed to GEM frames after the GEM encapsulation and further to GTC frames after GTC framing on the GEM frames. After PON physical layer processing on the GTC frames, PON physical layer processed frames are obtained.

After new Ethernet encapsulation is added to the IP packets, Ethernet frames are obtained; after GEM encapsulation on the Ethernet frames, GEM frames are obtained; after GTC framing on the GEM frames, GTC frames are obtained; after PON physical layer processing on the GTC frames, PON physical layer processed frames are obtained.

In addition, there are many Ethernet encapsulation methods for IP packets. For example, Ethernet encapsulation may be added to an IP packet as a whole; or the IP packet may be segmented and Ethernet encapsulation is added to each segment; or multiple IP packets may be combined into one packet and then Ethernet encapsulation is added.

S403. The processed frames are transferred to the OLT via the ODN.

Figure 5:
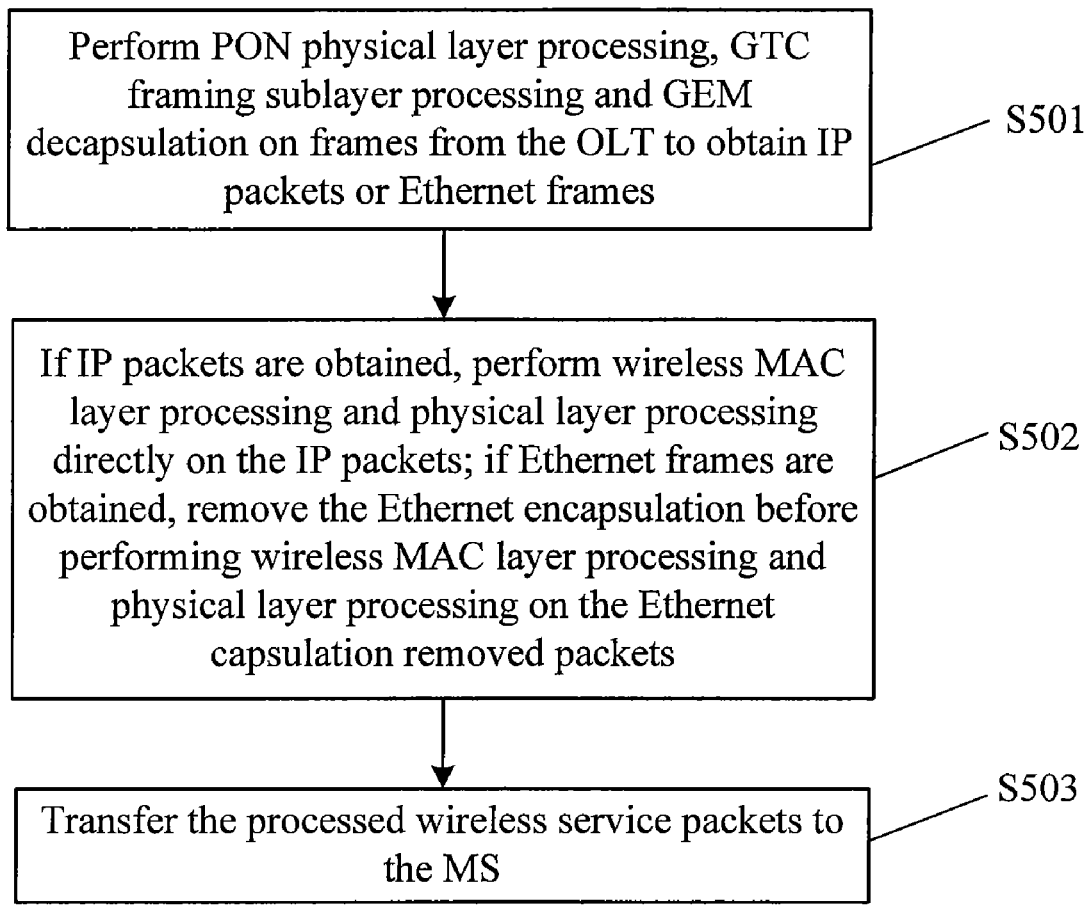
FIG. 5 is a flowchart where a BS processes a frame from an OLT according to an embodiment of the present disclosure.

As shown in FIG. 5, frames from the OLT are processed in the following steps:

S501. PON physical layer processing, GTC framing sub-layer processing and GEM decapsulation are performed on frames from the OLT to obtain IP packets or Ethernet frames.

In particular, frames from the OLT are frames after PON physical layer processing. After PON physical layer processing, GTC frames are obtained; after GTC framing sub-layer processing on the GTC frames, GEM frames are obtained; after the GEM frames are decapsulated, IP packets or Ethernet frames are obtained.

S502. If IP packets are obtained, wireless MAC layer processing and physical layer processing are directly performed on the IP packets; if Ethernet frames are obtained, the Ethernet encapsulation is removed, such as the frame header and frame trailer, and wireless MAC layer processing and physical layer processing are performed on the Ethernet capsulation removed packets. The Ethernet capsulation removed packets here are IP packets. In addition, after the Ethernet encapsulation is removed and the payload is extracted, IP packets may be obtained. In particular, a payload may be directly used as a required IP packet; or multiple payloads may be combined into one IP packet, which is used as a required IP packet; or a payload may be segmented and each segment is used as a required IP packet.

S503. The processed wireless service packets are transferred to the MS.

Figure 6:
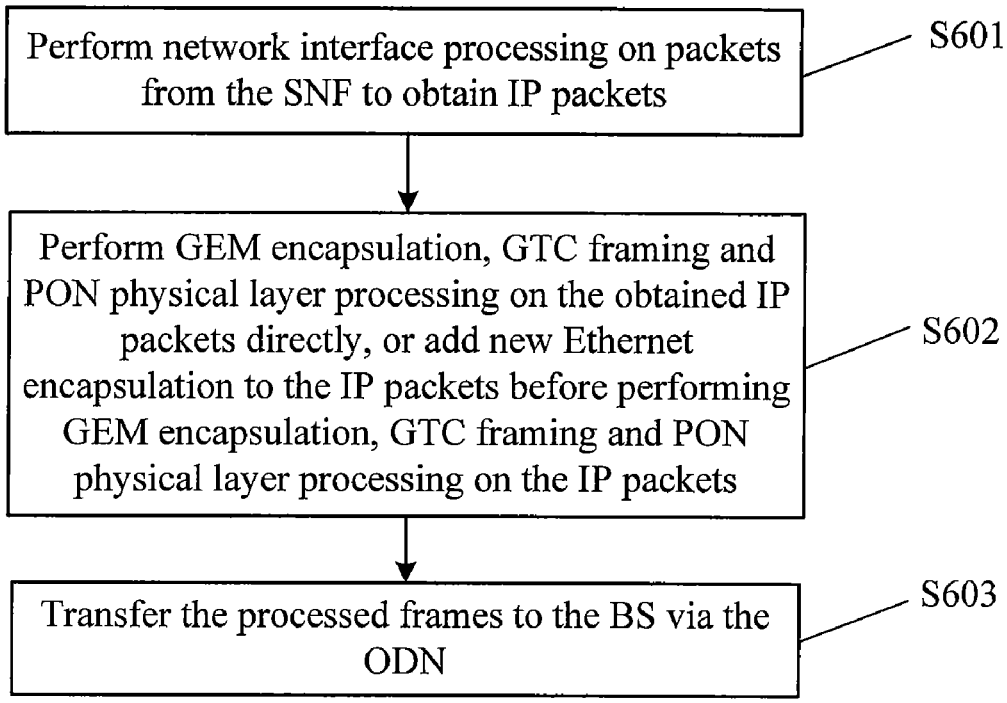
FIG. 6 is a flowchart where an OLT processes a packet from an SNF according to an embodiment of the present disclosure.

In FIG. 3, the OLT processes received packets as follows:

As shown in FIG. 6, frames from the SNF are processed in the following steps:

S601. Network interface processing is performed on packets from the SNF to obtain IP packets.

S602. GEM encapsulation, GTC framing and PON physical layer processing are performed on the IP packets directly, or new Ethernet encapsulation, such as the frame header and frame trailer, is added to the IP packets before GEM encapsulation, GTC framing and PON physical layer processing are performed on the IP packets.

In particular, the IP packets are changed to GEM frames after the GEM encapsulation and further to GTC frames after GTC framing on the GEM frames. After PON physical layer processing on the GTC frames, PON physical layer processed frames are obtained.

After new Ethernet encapsulation is added to the IP packets, Ethernet frames are obtained; after GEM encapsulation on the Ethernet frames, GEM frames are obtained; after GTC framing on the GEM frames, GTC frames are obtained; after PON physical layer processing on the GTC frames, PON physical layer processed frames are obtained.

In addition, there are many Ethernet encapsulation methods for IP packets. For example, Ethernet encapsulation may be added to an IP packet as a whole; or the IP packet may be segmented and Ethernet encapsulation is added to each segment; or multiple IP packets may be combined into one packet and then Ethernet encapsulation is added.

S603. The processed frames are transferred to the BS via the ODN.

Figure 7:
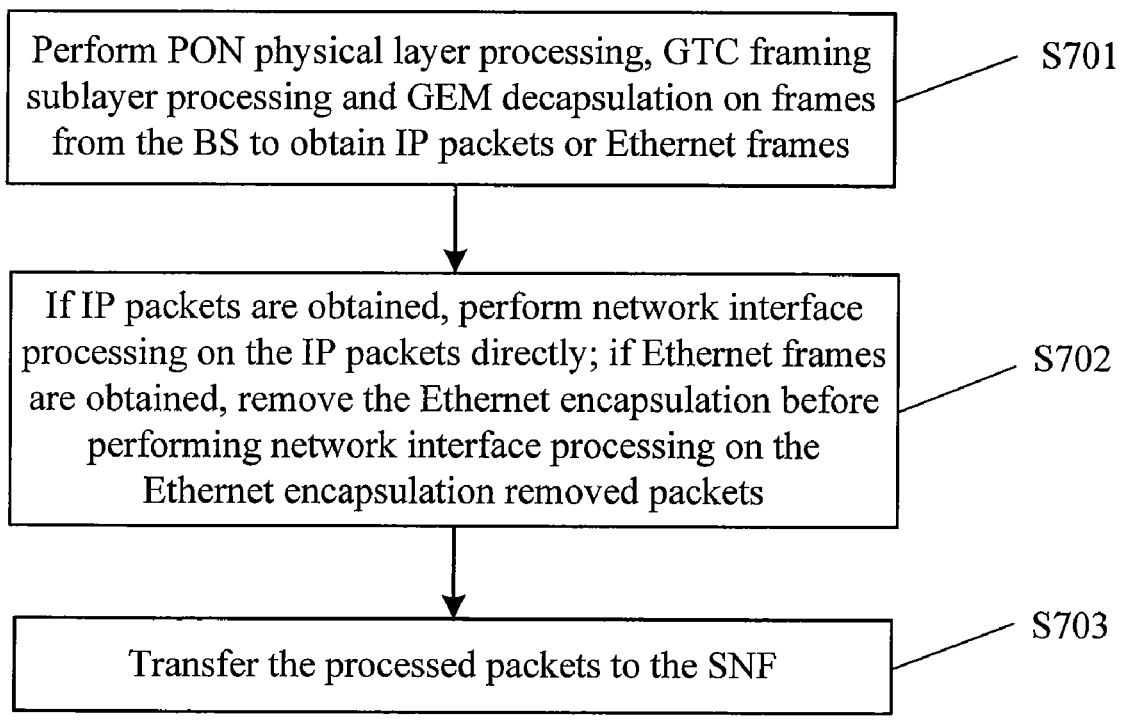
FIG. 7 is a flowchart where an OLT processes a frame from a BS according to an embodiment of the present disclosure.

As shown in FIG. 7, the OLT processes frames from the BS in the following steps:

S701. PON physical layer processing, GTC framing sub-layer processing and GEM decapsulation are performed on frames from the BS to obtain IP packets or Ethernet frames.

In particular, frames from the BS are frames after PON physical layer processing. After PON physical layer processing, GTC frames are obtained; after GTC framing sub-layer processing on the GTC frames, GEM frames are obtained; after the GEM frames are decapsulated, IP packets or Ethernet frames are obtained.

S702. If IP packets are obtained, network interface processing is performed on the IP packets directly; if Ethernet frames are obtained, the Ethernet encapsulation, such as the frame header and frame trailer, is removed and then network interface processing is performed on the Ethernet encapsulation removed packets. The Ethernet capsulation removed packets here are IP packets. In addition, after the Ethernet encapsulation is removed and the payload is extracted, IP packets can be obtained. In particular, a payload may be directly used as a required IP packet; or multiple payloads may be combined into one IP packet, which is used as a required IP packet; or a payload may be segmented and each segment is used as a required IP packet.

S703. The processed packets are transferred to the SNF.

In addition to the above methods, embodiments of the present invention provide multiple apparatuses for bearing IP packets over a PON. One apparatus for bearing IP packets over a PON according to an embodiment of the present disclosure includes: an IP packet obtaining unit, configured to obtain IP packets; a converting unit, configured to convert the IP packets obtained by the IP packet obtaining unit into GEM frames; a GTC framing unit, configured to perform GTC framing on the GEM frames obtained by the converting unit to obtain GTC frames; and a PON physical layer processing unit, configured to perform PON physical layer processing on the GTC frames obtained by the GTC framing unit.

Another apparatus for bearing IP packets over a PON includes: a frame obtaining unit, configured to obtain PON physical layer processed frames; a PON physical layer processing unit, configured to convert the PON physical layer processed frames obtained by the frame obtaining unit into GTC frames; a GTC framing sub-layer processing unit, configured to perform GTC framing sub-layer processing on the GTC frames obtained by the PON physical layer processing unit to obtain GEM frames; and a converting unit, configured to convert the GEM frames obtained by the GTC framing sub-layer processing unit into IP packets.

The function units in the above two apparatuses for bearing IP packets over a PON may be built in the BS or OLT and work in a same way in the BS or OLT as they work in the two apparatuses for bearing IP packets over a PON.

In addition to the methods and apparatuses, embodiments of the present disclosure provide a BS and an OLT.

A BS in an embodiment of the present disclosure includes: a wireless processing unit, a PON adapter function unit, a PON TC layer function unit, and an ODN interface function unit.

When the BS receives radio air interface packets, the wireless processing unit is adapted to perform wireless physical layer processing and MAC layer processing on the radio air interface packets to obtain IP packets; the PON adapter function unit is configured to transfer the IP packets obtained by the wireless processing unit transparently to the PON TC layer function unit, or convert the IP packets provided by the wireless processing unit into Ethernet frames and transfer the Ethernet frames to the PON TC layer function unit. The PON TC layer function unit is configured to convert the IP packets or Ethernet frames provided by the PON adapter function unit into GEM frames, perform GTC framing on the GEM frames to obtain GTC frames, and perform PON physical layer processing on the GTC frames. The ODN interface function unit is configured to transfer the PON physical layer processed frames provided by the PON TC layer function unit to the ODN.

When the BS receives PON physical layer processed frames from the ODN, the ODN interface function unit is configured to transfer the PON physical layer processed frames provided by the ODN to the PON TC layer function unit; the PON TC layer function unit is configured to convert the PON physical layer processed frames provided by the ODN interface function unit into GTC frames, perform GTC framing sub-layer processing on the GTC frames to obtain GEM frames, and convert the GEM frames into IP packets or Ethernet frames; the PON adapter function unit is configured to transfer the IP packets provided by the PON TC layer function unit transparently to the wireless processing unit, or convert the Ethernet frames provided by the PON TC layer function unit into IP packets and transfer the IP packets to the wireless processing unit; the wireless processing unit is configured to perform wireless MAC layer processing and physical layer processing on the IP packets provided by the PON adapter function unit to obtain radio air interface packets.

Figure 8:
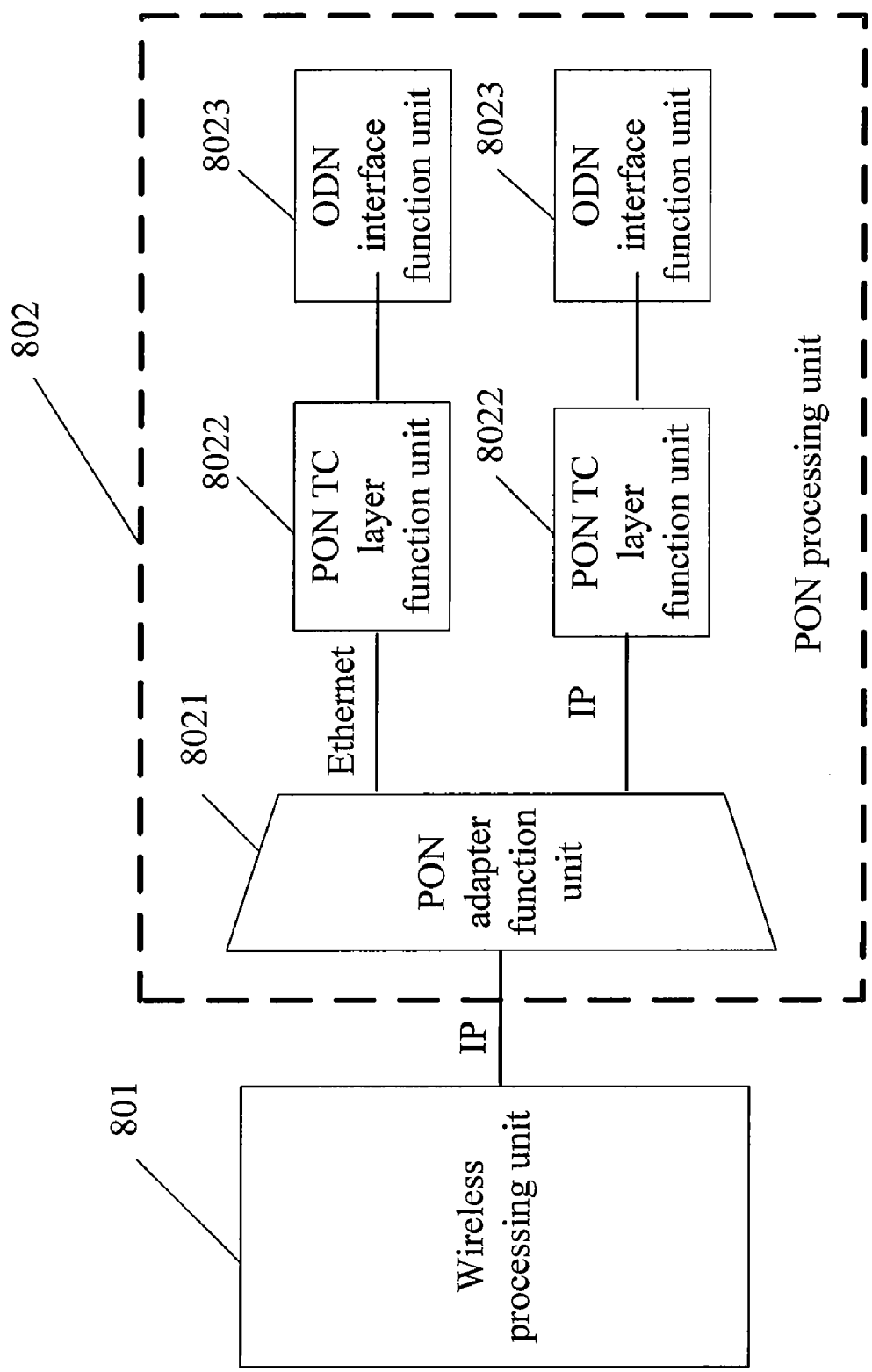
FIG. 8 is a schematic diagram of a BS according to an embodiment of the present disclosure.

In particular, as shown in FIG. 8, the BS includes a wireless processing unit 801 and a PON processing unit 802. The wireless processing unit 801 is configured to perform wireless physical layer processing and wireless MAC layer processing on wireless service packets or perform wireless MAC layer processing and wireless physical layer processing on IP packets. The PON processing unit 802 is configured to implement the GPON protocol stack. The PON processing unit 802 includes a PON adapter function unit 8021, a PON TC layer function unit 8022, and an ODN interface function unit 8023.

The PON adapter function unit 8021 transfers the IP packets provided by the wireless processing unit 801 transparently to the PON TC layer function unit 8022 or adds Ethernet encapsulation, such as the frame header and frame trailer, to the IP packets provided by the wireless processing unit 801 and transfers the Ethernet frames to the PON TC layer function unit 8022, where the destination MAC address of the added Ethernet encapsulation is the MAC address of the OLT, and the source MAC address is the MAC address of the BS. Further, the PON adapter function unit 8021 also transfers IP packets provided by the PON TC layer function unit 8022 transparently to the wireless processing unit 801, or removes Ethernet encapsulation, such as the frame header and frame trailer, from Ethernet frames provided by the PON TC layer function unit 8022 and transfers the obtained IP packets to the wireless processing unit 801.

The PON TC layer function unit 8022 implements the GPON transmission convergence layer functions in the GPON protocol stack. It performs GEM encapsulation and GEM decapsulation on IP packets or Ethernet frames and performs GPON physical layer functions on the decapsulated GTC frames.

The ODN interface function unit 8023 is configured to transfer PON physical layer processed frames to the ODN or receive PON physical layer processed frames from the ODN.

Although the PON adapter function unit 8021 is able to process both IP packets and Ethernet frames, and there are PON TC layer function units 8022 to process IP packets and Ethernet frames respectively. In practice, the PON adapter function unit 8021 may process only IP packets or only Ethernet frames, and only one PON TC layer function unit 8022 and only one ODN interface function unit 8023 are placed. The only one PON TC layer function unit 8022 processes only IP packets or only Ethernet frames.

An OLT in an embodiment of the present disclosure includes: a network interface processing unit, a PON adapter function unit, a PON TC layer function unit, and an ODN interface function unit.

When the OLT receives packets in the network interface format, the network interface processing unit is configured to perform network interface processing on the network interface packets to obtain IP packets; the PON adapter function unit is configured to transfer the IP packets obtained by the network interface processing unit transparently to the PON TC layer function unit, or convert the IP packets provided by the network interface processing unit into Ethernet frames and transfer the Ethernet frames to the PON TC layer function unit; the PON TC layer function unit is configured to convert the IP packets or Ethernet frames provided by the PON adapter function unit into GEM frames, perform GTC framing on the GEM frames to obtain GTC frames, and perform PON physical layer processing on the GTC frames; the ODN interface function unit is configured to transfer the PON physical layer processed frames provided by the PON TC layer function unit to the ODN; and/or When the OLT receives PON physical layer processed frames from the ODN, the ODN interface function unit is configured to transfer the PON physical layer processed frames provided by the ODN to the PON TC layer function unit; the PON TC layer function unit is configured to convert the PON physical layer processed frames provided by the ODN interface function unit into GTC frames, perform GTC framing sub-layer processing on the GTC frames to obtain GEM frames and convert the GEM frames into IP packets or Ethernet frames; the PON adapter function unit is configured to convert the Ethernet frames provided by the PON TC layer function unit into IP packets and transfer the IP packets to the network interface processing unit; and the network interface processing unit is configured to perform network interface processing on the IP packets provided by the PON adapter function unit to obtain packets in the network interface format.

Figure 9:
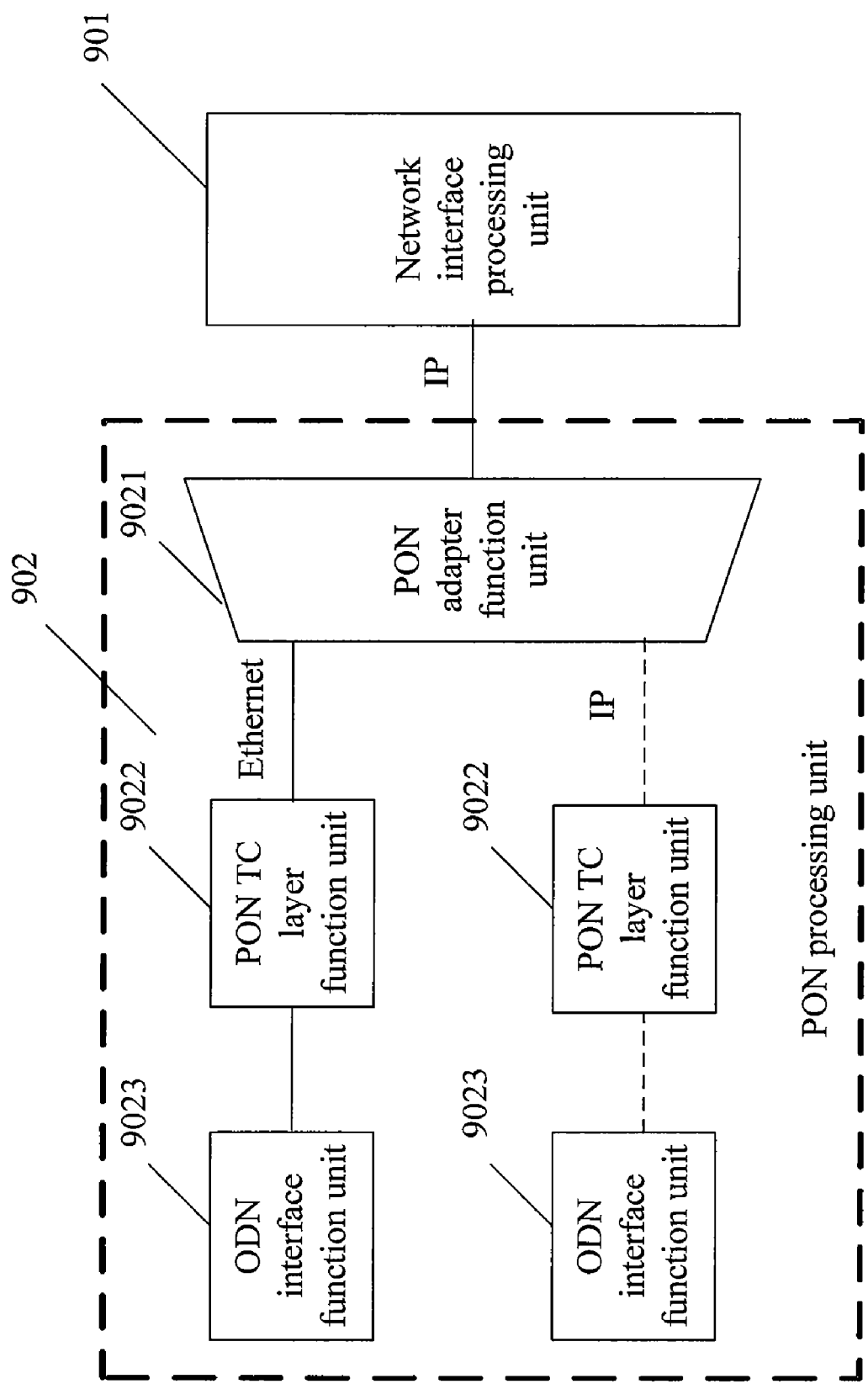
FIG. 9 is a schematic diagram of an OLT in an embodiment of the present disclosure.

In particular, as shown in FIG. 9, the OLT includes a network interface processing unit 901 and a PON processing unit 902. The network interface processing unit 901 is configured to perform network interface processing on IP packets or packets provided by the SNF; the PON processing unit 902 is configured to implement the GPON protocol stack and includes a PON adapter function unit 9021, a PON TC layer function unit 9022 and an ODN interface function unit 9023.

The PON adapter function unit 9021 transfers IP packets provided by the network interface processing unit 901 transparently to the PON TC layer function unit 9022 or adds Ethernet encapsulation, such as the frame header and frame trailer, to the IP packets provided by the network interface processing unit 901 and transfers the Ethernet frames to the PON TC layer function unit 9022, where the destination MAC address of the added Ethernet encapsulation is the MAC address of the BS, and the source MAC address is the MAC address of the OLT; further, the PON adapter function unit 9021 also transfers IP packets provided by the PON TC layer function unit 9022 transparently to the network interface processing unit 901, or removes Ethernet encapsulation (such as the frame header and frame trailer) from Ethernet frames provided by the PON TC layer function unit 9022 and transfers the obtained IP packets to the network interface processing unit 901.

The PON TC layer function unit 9022 implements the GPON transmission convergence layer functions in the GPON protocol stack. It performs GEM encapsulation and GEM decapsulation on IP packets or Ethernet frames and performs GPON physical layer functions on the decapsulated GTC frames.

The ODN interface function unit 9023 is configured to transfer PON physical layer processed frames to the ODN or receive PON physical layer processed frames from the ODN.

Although the PON adapter function unit 9021 is able to process both IP packets and Ethernet frames, and there are PON TC layer function units 9022 to process IP packets and Ethernet frames respectively. In practice, the PON adapter function unit 9021 may process only IP packets or only Ethernet frames, and only one PON TC layer function unit 9022 and only one ODN interface function unit 9023 are placed. The only one PON TC layer function unit 9022 processes only IP packets or only Ethernet frames. A process of direct GEM encapsulation on radio encapsulated IP packets and the corresponding GEM decapsulation process will be described.

Figure 10A:
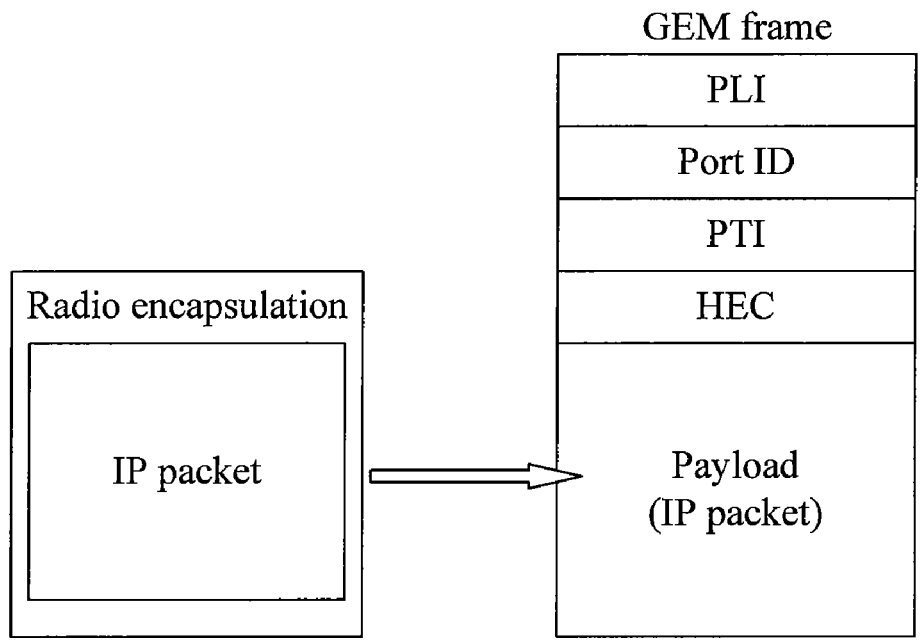
FIG. 10A is a schematic diagram of direct GEM encapsulation on a radio encapsulated IP packet according to an embodiment of the present disclosure.

FIG. 10A is a schematic diagram of direct GEM encapsulation on radio encapsulated IP packets. An encapsulated GEM frame header is usually five bytes long (40 bits), including Payload Length Indicator (PLI), Port ID, Payload Type Indicator (PTI), and Header Error Check (HEC), where: PLI has 12 bits; Port ID has 12 bits; PTI has 3 bits; and HEC has 13 bits.

Figure 10B:
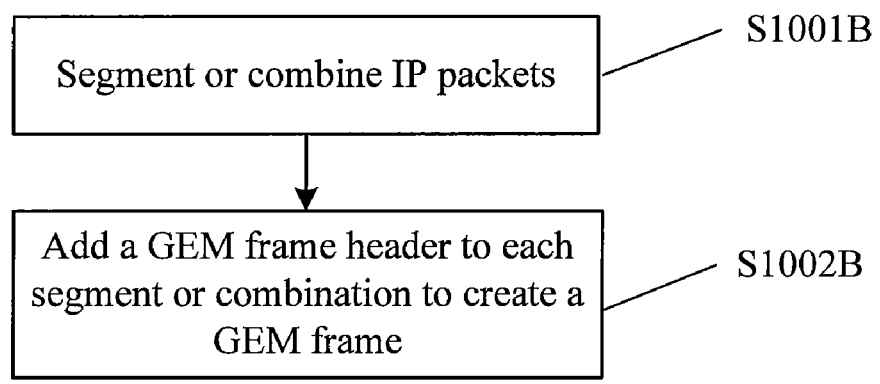
FIG. 10B is a flowchart of GEM encapsulation based on FIG. 10A according to an embodiment of the present disclosure.

A specific GEM encapsulation process is shown in FIG. 10B, including:

S1001B. IP packets are segmented or combined, where each segment or combination may be a payload of a GEM frame.

S1002B. A GEM frame header is added to each segment or combination to create a GEM frame.

Figure 11A:
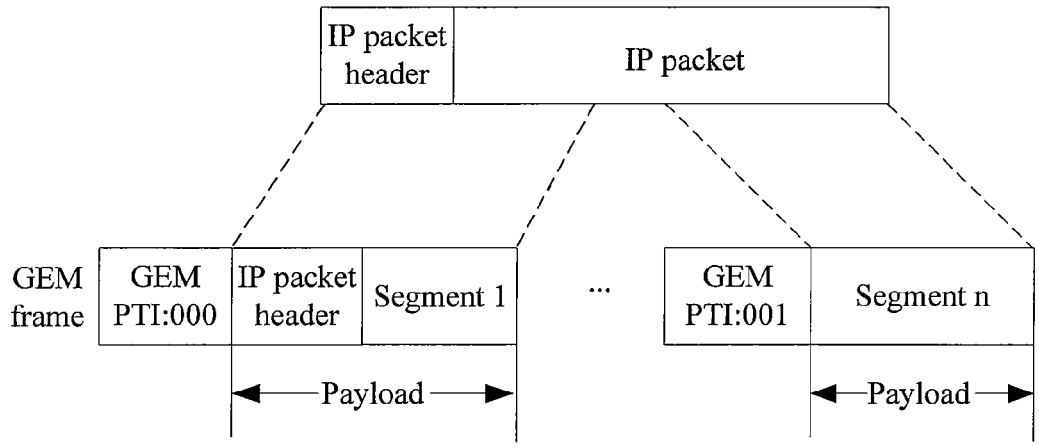
FIG. 11A shows a process where an IP packet is segmented to form GEM frames according to an embodiment of the present disclosure.
Figure 11B:
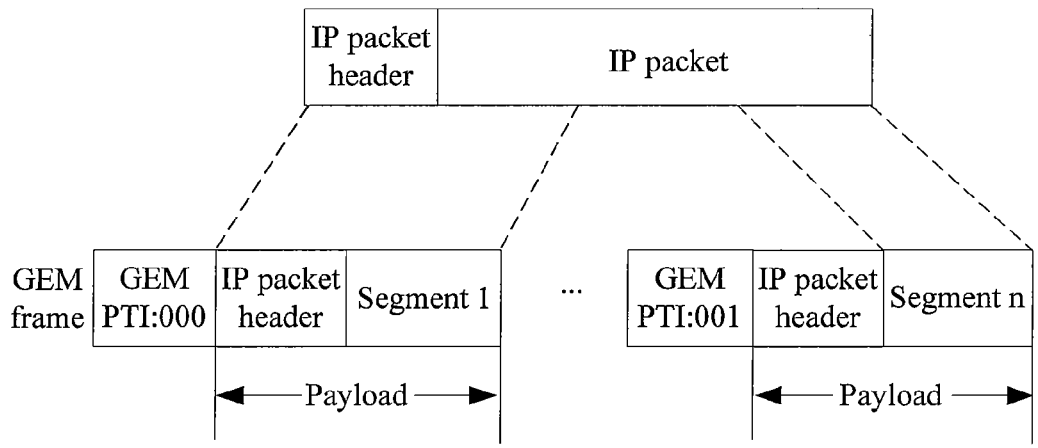
FIG. 11B shows a process where an IP packet is segmented to form GEM frames according to an embodiment of the present disclosure.
Figure 11C:
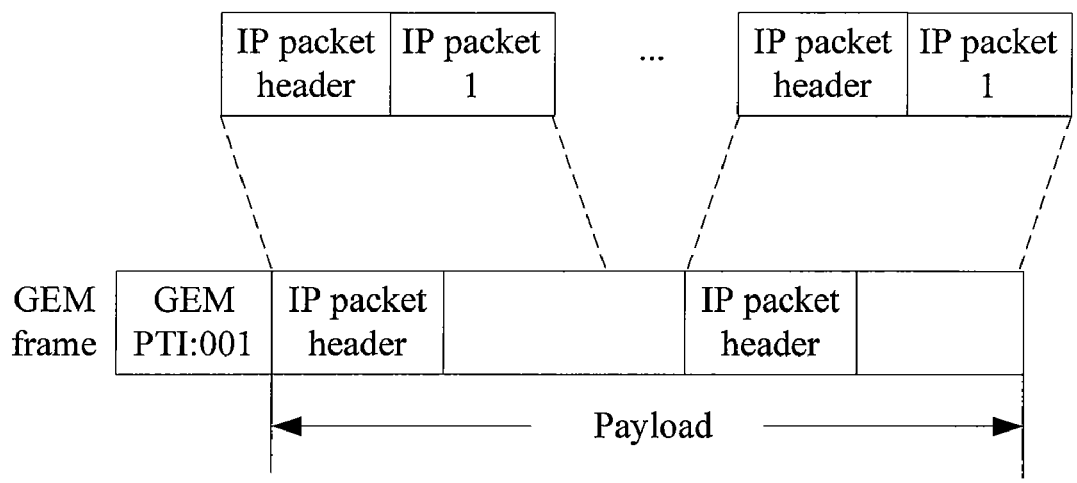
FIG. 11C shows a process where IP packets are combined to form a GEM frame according to an embodiment of the present disclosure.

FIGS. 11A, 11B, and 11C are respective schematic diagrams of GEM frames created after IP packet segmentation or combination. As shown in FIG. 11A, an IP packet is divided into n segments and each segment is used as a payload of a GEM frame, and only segment 1 includes an IP packet header while other segments have no IP packet header. As shown in FIG. 11B, an IP packet is divided into n segments and each segment is used as a payload of a GEM frame, and each segment includes the same IP packet header, which is the IP packet header of the original IP packet. As shown in FIG. 11C, n IP packets are combined as a payload of a GEM frame and in the payload, every previous IP packet retains the original IP packet header.

In addition, the least significant bit of PTI may be used to indicate whether an IP packet segment is the last segment of the IP packet. As shown in FIGS. 11A, 11B, and 11C, when PTI is "000", the segment is not the last segment and when PTI is "001", the segment is the last segment.

Figure 12:
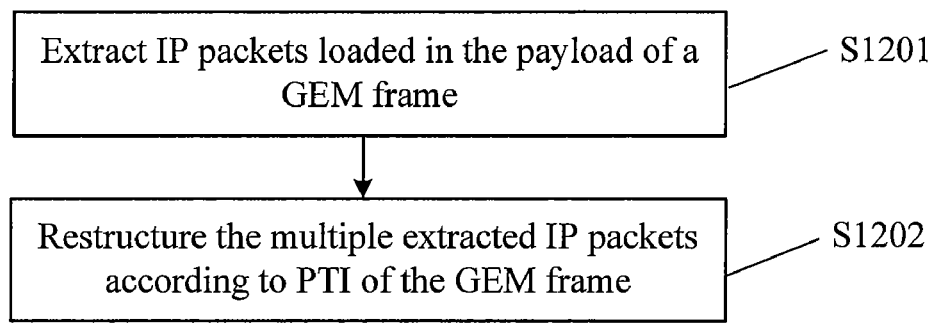
FIG. 12 is a flowchart of GEM decapsulation corresponding to FIG. 10B according to an embodiment of the present disclosure.

The GEM decapsulation process corresponding to FIG. 10B is shown in FIG. 12, including:

S1201. IP packets loaded in the payload of a GEM frame are extracted.

S1202. The multiple extracted IP packets are restructured according to PTI of the GEM frame.

A process of Ethernet framing on radio encapsulated IP packets will be described.

Figure 13A:
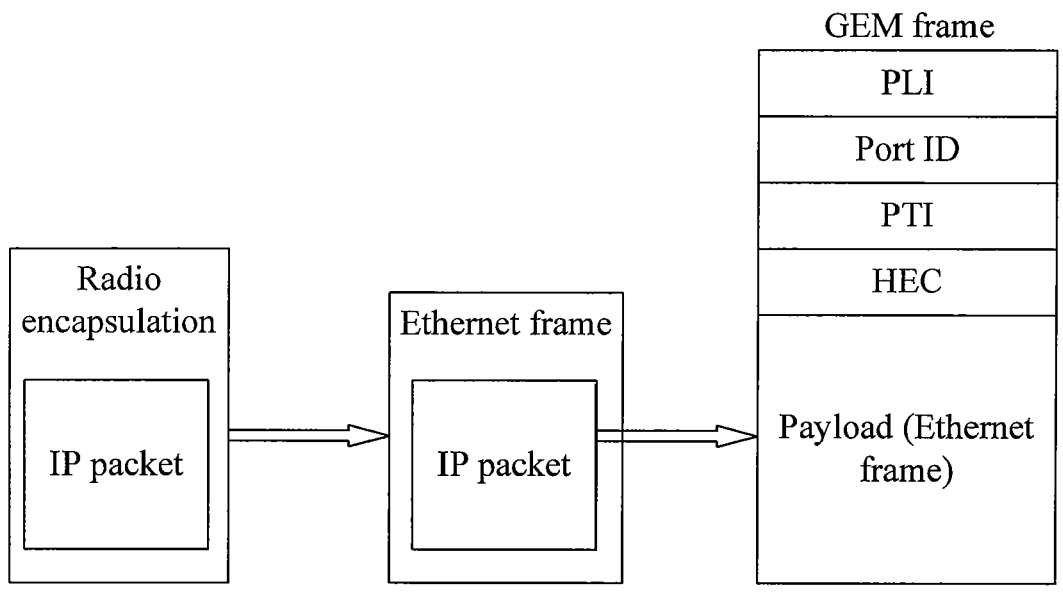
FIG. 13A is a schematic diagram of Ethernet framing and then GEM encapsulation on a radio encapsulated IP packet according to an embodiment of the present disclosure.

FIG. 13A is a schematic diagram of Ethernet framing and then GEM encapsulation on radio encapsulated IP packets.

Figure 13B:
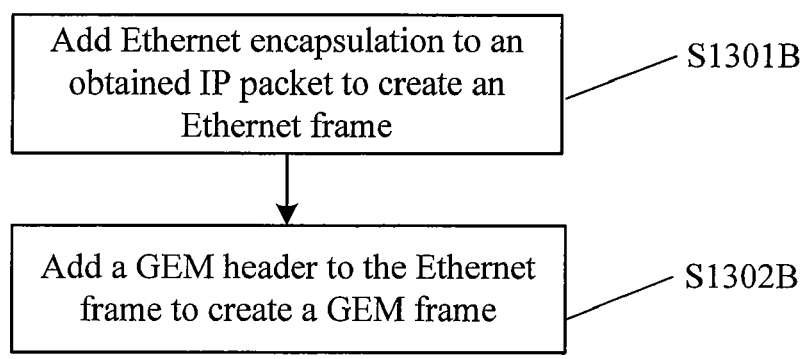
FIG. 13B is a flowchart of Ethernet framing based on FIG. 13A.

A specific Ethernet framing process is shown in FIG. 13B, including:

S1301B. Ethernet encapsulation, such as the frame header and frame trailer, is added to an obtained IP packet to create an Ethernet frame. If the length of the IP packet exceeds the length limit of an Ethernet frame, the IP packet is segmented and Ethernet encapsulation, such as the frame header and frame trailer, is added to each segment to create an Ethernet frame.

Figure 13C:
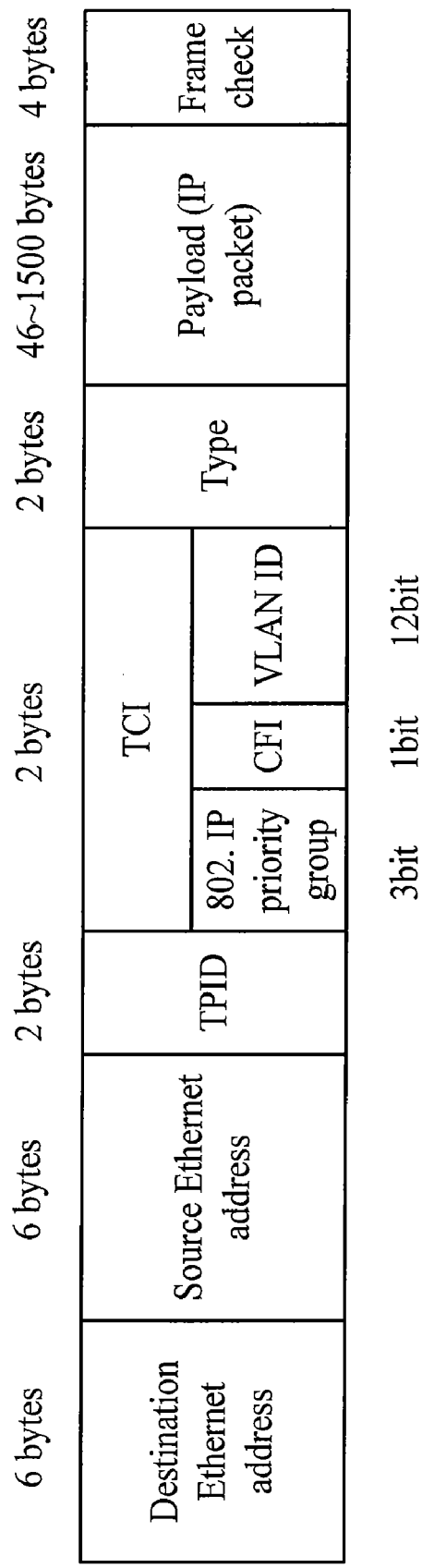
FIG. 13C is a schematic diagram of the format of an Ethernet frame according to an embodiment of the present disclosure.

S1302B. A GEM header is added to the Ethernet frame to create a GEM frame. FIG. 13C shows the format of an Ethernet frame, where: Tag Protocol Identifier (TPID) is "0x8100" and includes two bytes; Tag Control Information (TCI) also includes two bytes; and Canonical Format Indicator (CFI) includes one bit.

Figure 14:
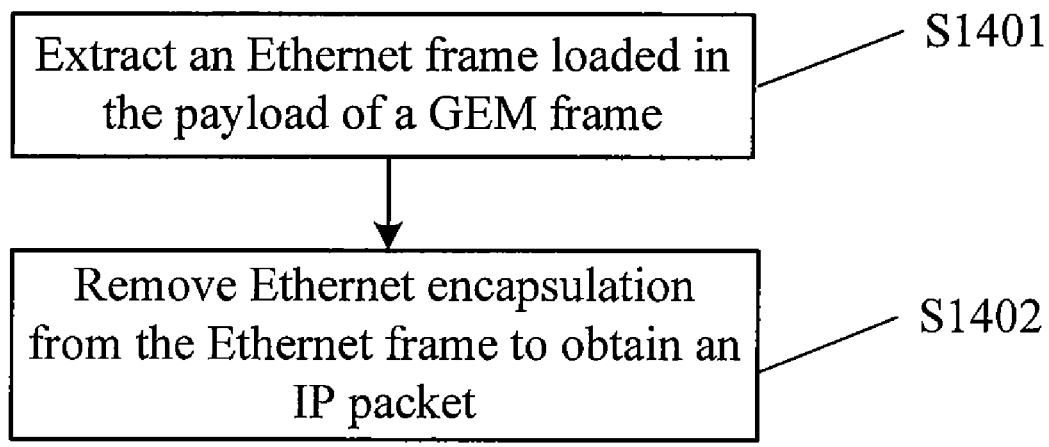
FIG. 14 is a flowchart of GEM decapsulation corresponding to FIG. 13B according to an embodiment of the present disclosure.

The GEM decapsulation process corresponding to FIG. 13B is shown in FIG. 14, including:

S1401. An Ethernet frame loaded in the payload of a GEM frame is extracted.

S1402. Ethernet encapsulation, such as the frame header and frame trailer, is removed from the Ethernet frame to obtain IP packets. If multiple IP packets are obtained and the IP packets are all segments of one IP packet, the segments may be recombined into one IP packet.

For GEM encapsulation and decapsulation processing of the OLT, the embodiments shown in FIGS. 10A to 14 can be referenced. The difference is that, when the OLT extracts IP packets from the network, the OLT extracts IP packets from frames in the network interface format.

A PON system provided by an embodiment of the present disclosure is shown in FIG. 3. The PON system includes an OLT, an ODN and a BS. The ODN is implemented according to the prior art and will not be described. The OLT is the OLT described in the foregoing embodiments. The BS is the BS described in the foregoing embodiments. In the downlink, the OLT receives IP packets from the SNF on the network side, and converts the IP packets into GTC frames and transfers the GTC frames to the BS. The BS processes the GTC frames, converts them into a protocol format supported by the MS and sends the converted frames. In the downlink, the BS receives radio interface packets from the MS on the user side, processes the packets to obtain IP packets, and converts the IP packets into GTC frames, and transfers the GTC frames to the OLT via the ODN. Thus, the present disclosure realizes bearing of IP packets over a PON.

It is understandable to those skilled in the art that all or part of the processes of the method in the foregoing embodiments of the present disclosure may be completed by hardware instructed by a computer program. The program may be stored in a computer readable storage medium, and may include processes of the preceding method during execution. The storage medium may be a magnetic disk, a Compact Disk (CD), a Read-Only Memory (ROM) or a Random Access Memory (RAM).

Although the present disclosure has been described through several exemplary embodiments, the disclosure is not limited to such embodiments. It is apparent that those skilled in the art can make various modifications and variations to the disclosure without departing from the scope of the present disclosure. The disclosure is intended to cover the modifications and variations provided that they fall in the scope of protection defined by the following claims or their equivalents.

What is claimed is:

1. A method for bearing Internet Protocol (IP) packets over a Passive Optical Network (PON), comprising:

performing, by a Base Station (BS), wireless physical layer and Media Access Control (MAC) layer processing on a received radio air interface packet to obtain an IP packet;

converting, by the BS, the IP packet into a Gigabit PON Encapsulation Method (GEM) frame directly;

performing a Gigabit PON Transmission Convergence (GTC) framing on the GEM frame to obtain a GTC frame;

performing a PON physical layer processing on the GTC frame to obtain a PON physical layer processed frame; and transferring, by the BS, the PON physical layer processed frame to an Optical Line Terminal (OLT) via an Optical Distribution Network (ODN).

2. The method of claim 1, wherein the converting the IP packet into the GEM frame comprises: using the IP packet as a payload and adding a GEM frame header to create the GEM frame.

3. The method of claim 2, wherein the IP packet is used as a payload in at least one of the following modes:

using the entire IP packet as a payload; or segmenting the IP packet and using each segment as a payload; or combining multiple IP packets into one packet and using the one packet as a payload.

4. The method of claim 3, wherein the IP packet is used as a payload in segmenting the IP packet and using each segment as a payload, further comprising: segmenting the IP packet, using each segment as a payload, and adding a GEM frame header to each segment to create a GEM frame.

5. The method of claim 1, further comprising:
obtaining a PON physical layer processed frame;
converting the PON physical layer processed frame into a Gigabit PON Transmission Convergence (GTC) frame;
performing a GTC framing sub-layer processing on the GTC frame to obtain a Gigabit PON Encapsulation Method (GEM) frame; and
converting the GEM frame into an IP packet directly.

6. The method of claim 5, wherein the converting the GEM frame into the IP packet directly comprises: removing a GEM frame header, extracting a payload and obtaining the IP packet.

7. The method of claim 6, wherein the IP packet is obtained in at least one of the following modes:
using the payload directly as a required IP packet; or
combining multiple payloads into one IP packet and using the one IP packet as a required IP packet; or
segmenting the payload and using each segment as a required IP packet.

8. An Base Station (BS) for bearing Internet Protocol (IP) packets over a Passive Optical Network (PON), comprising:
an IP packet obtaining unit, configured to perform wireless physical layer and Media Access Control (MAC) layer processing on a received radio air interface packet to obtain an IP packet;
a PON Transmission Convergence (TC) layer function unit, configured to convert the IP packet obtained by the IP packet obtaining unit into a Gigabit PON Encapsulation Method (GEM) frame directly, perform a GTC framing on the GEM to obtain a GTC frame, and perform a PON physical layer processing on the GTC frame to obtain a PON physical layer processed frame;
an Optical Distribution Network (ODN) interface function unit, configured to transfer the PON physical layer processed frame provided by the PON TC layer function unit to an Optical Line Terminal (OLT) via an ODN.

9. The BS of claim 8, wherein
the ODN interface function unit is further configured to transfer a PON physical layer processed frame provided by an ODN to the PON TC layer function unit;
the PON TC layer function unit is further configured to convert the PON physical layer processed frame into a Gigabit PON Transmission Convergence (GTC) frame, perform a GTC framing sub-layer processing on the GTC frame to obtain a Gigabit PON Encapsulation Method (GEM) frame; and convert the GEM frame into an IP packet directly; and
the IP packet obtaining unit is further configured to perform a Media Access Control (MAC) layer processing and a wireless physical layer processing on the IP packet to obtain a radio air interface packet.

10. A Passive Optical Network (PON) system, comprising an Optical Line Termination (OLT), an Optical Distribution Network (ODN), and at least one Base Station (BS), wherein:
the OLT is connected to the BS via the ODN;
the BS is configured to perform wireless physical layer and Media Access Control (MAC) layer processing on a received radio air interface packet to obtain an IP packet; convert the IP packet into a Gigabit PON Encapsulation Method (GEM) frame directly, perform a GTC framing on the GEM to obtain a GTC frame and perform a PON physical layer processing on the GTC frame to obtain a PON physical layer processed frame; transfer the PON physical layer processed frame via the ODN to the OLT;
the OLT is configured to receive the PON physical layer processed frame provided by the ODN, convert the PON physical layer processed frame into a Gigabit PON Transmission Convergence (GTC) frame, perform a GTC framing sub-layer processing on the GTC frame to obtain a Gigabit PON Encapsulation Method (GEM) frame; and convert the GEM frame into an IP packet directly; and perform a network interface processing on the IP packet to obtain a packet in a network interface format.

* * * * *